United States Patent
Koui et al.

(10) Patent No.: US 8,922,949 B1
(45) Date of Patent: Dec. 30, 2014

(54) MAGNETIC RECORDING HEAD AND MAGNETIC RECORDING/REPRODUCING APPARATUS USING THE SAME

(71) Applicant: Kabushiki Kaisha Toshiba, Minato-ku, Tokyo (JP)

(72) Inventors: Katsuhiko Koui, Yokohama (JP); Hiromi Yuasa, Kawasaki (JP); Mariko Shimizu, Kawasaki (JP); Shuichi Murakami, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/099,766

(22) Filed: Dec. 6, 2013

(30) Foreign Application Priority Data

Aug. 26, 2013 (JP) .................................. 2013-174606

(51) Int. Cl.
*G11B 5/02* (2006.01)

(52) U.S. Cl.
USPC ..................................................... 360/125.3

(58) Field of Classification Search
USPC ..................................................... 360/125.3
See application file for complete search history.

(56) References Cited

U.S. PATENT DOCUMENTS

| | | | |
|---|---|---|---|
| 7,556,869 B2 | 7/2009 | Fukushima et al. | |
| 7,764,136 B2 | 7/2010 | Suzuki et al. | |
| 8,537,497 B2 * | 9/2013 | Nagasaka et al. | 360/125.3 |
| 8,553,362 B2 * | 10/2013 | Tanabe et al. | 360/125.3 |
| 8,614,861 B1 * | 12/2013 | Tomoda et al. | 360/125.3 |
| 8,687,321 B2 * | 4/2014 | Yamada et al. | 360/125.3 |
| 8,724,261 B2 * | 5/2014 | Suto et al. | 360/125.3 |
| 8,755,150 B2 * | 6/2014 | Chen et al. | 360/125.3 |
| 2005/0111142 A1 | 5/2005 | Oshima | |
| 2006/0056113 A1 | 3/2006 | Fukushima et al. | |
| 2008/0112087 A1 * | 5/2008 | Clinton et al. | 360/317 |
| 2008/0225577 A1 | 9/2008 | Hosotani et al. | |
| 2009/0052095 A1 | 2/2009 | Yamada et al. | |
| 2010/0220415 A1 | 9/2010 | Yamada et al. | |
| 2011/0228427 A1 | 9/2011 | Yuasa et al. | |
| 2011/0299192 A1 | 12/2011 | Yamada et al. | |
| 2011/0300409 A1 | 12/2011 | Yamada et al. | |
| 2012/0268844 A1 | 10/2012 | Yamada et al. | |

FOREIGN PATENT DOCUMENTS

| | | |
|---|---|---|
| JP | 2006-108631 | 4/2006 |
| JP | 2008-227009 | 9/2008 |
| JP | 4358279 | 8/2009 |
| JP | 5010702 | 6/2012 |

OTHER PUBLICATIONS

Akio Fukushima et al, "Peltier cooling in current-perpendicular-to-plane metallic junctions", "Journal of Applied Physics 99, 08H706 (2006)", published Apr. 24, 2006.

(Continued)

*Primary Examiner* — Mark Blouin
(74) *Attorney, Agent, or Firm* — Knobbe, Martens, Olson & Bear LLP

(57) ABSTRACT

According to one embodiment, the magnetic recording head comprises a cooling/heating material between a laminated oscillator and a main magnetic pole, the cooling/heating material including the following layers laminated from the laminated oscillator side in the following order, a first thermoelectric material layer having the same junction area as that of the laminated oscillator, a first metal material layer having the same junction area as that of the laminated oscillator, a second metal material layer having the same junction area as that of the main magnetic pole, and a second thermoelectric material layer having the same junction area as that of the main magnetic pole.

30 Claims, 7 Drawing Sheets

(56) References Cited

OTHER PUBLICATIONS

AIST Nano-electronics Research Institute et al, "10a-ZD-16 Peltier cooling effect in sub-micron-sized elements consisting of various materials", "Extended Abstract of the 70th Japan Society of Applied Physics (2009 Autumn University of Toyama)", Autumn 2009 (Japan), p. 701.

Atsushi Sugihara et al, "Giant Peltier Effect in a Submicron-Sized Cu-Ni/Au Junction with Nanometer-Scale Phase Separation", "Applied Physics Express 3 (2010) 065204", published May 28, 2010.

* cited by examiner

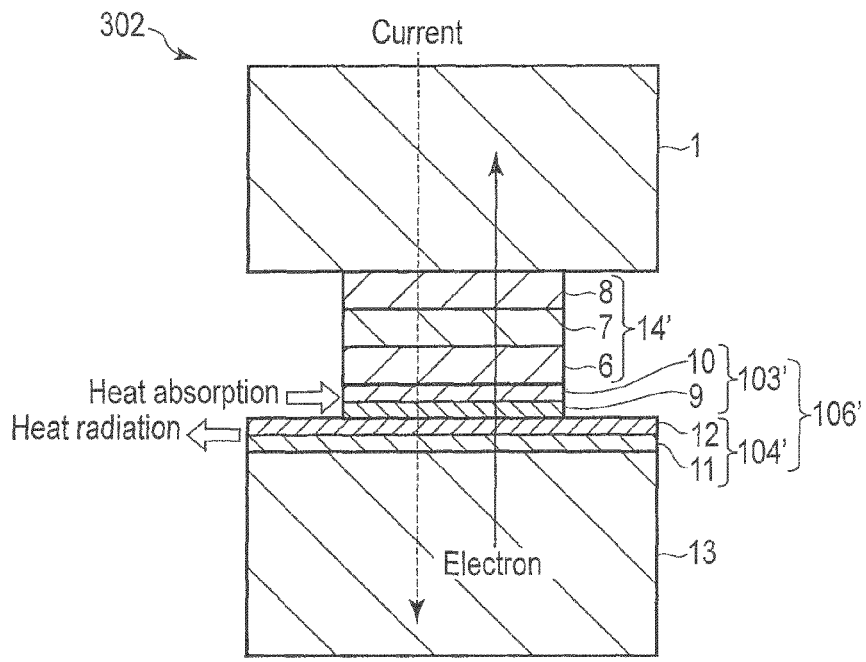
F I G. 11
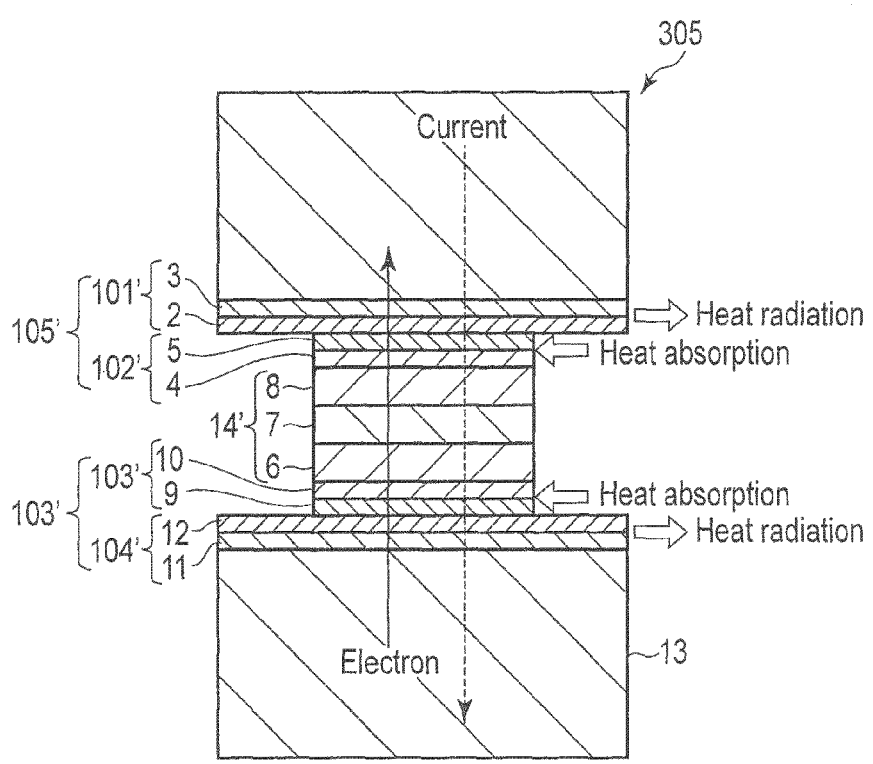
F I G. 12

MAGNETIC RECORDING HEAD AND MAGNETIC RECORDING/REPRODUCING APPARATUS USING THE SAME

CROSS-REFERENCE TO RELATED APPLICATIONS

This application is based upon and claims the benefit of priority from Japanese Patent Application No. 2013-174606, filed Aug. 26, 2013, the entire contents of which are incorporated herein by reference.

FIELD

Embodiments described herein relate generally to a magnetic recording head and a magnetic recording/reproducing apparatus using the same.

BACKGROUND

A magnetic recording head employing a certain energy assist has been proposed to increase storage density of a hard disk drive. In addition to a conventional heat assist technique, a high-frequency (micro wave) assist technique with spin transfer torque (STT) has been proposed as such an energy assist, for example.

As to the high-frequency assist technique, the effect thereof becomes higher when the oscillation strength of an oscillator is stronger. However, when a temperature rises up around a working temperature of a hard disk drive, the high-frequency oscillation decreases and eventually, vanishes. Thus, cooling down the oscillator is required to deal with this problem.

Here, turning to a cooling technique of, for example, a current perpendicular element, the Peltier effect is used. By the Peltier effect applied to the current perpendicular element, there have been reports that the Au/Co junction may be used as a part of the current perpendicular element and that the Au/Ni—Cu junction may be used to obtain a voltage change corresponding to such a remarkable cooling effect of Δ200° C. Furthermore, a reproducing head using such cooling effects has been proposed.

The Peltier effect is a phenomenon in which heat absorption or heat radiation occurs when electric current is supplied to a junction surface between different materials. When the Peltier effect is applied, a potential difference occurs at the junction surface between the different materials, and the heat absorption is achieved when the electronic potential is up and the heat radiation is achieved when the electronic potential is down. The Peltier effect was discovered by Jean-Charles Peltier in 1834, and its cooling effect is represented by the following equation.

$$\Delta Q = \Pi I \Delta t$$

Here, $\Delta Q$ is an amount of heat radiated from or absorbed at the junction, $\Pi$ is the Peltier coefficient inherent to the materials, $\Delta t$ is a time of supplying the current, and I is the current. The efficiency of cooling or heating is determined based on the Peltier coefficient inherent to the materials, and thus, a suitable combination of the materials must be selected for the efficient cooling.

However, there is a technical difficulty in applying such a cooling method for the current perpendicular element directly to a cooling method for the high-frequency assist head. That is, the current perpendicular element or a reproducing head has such a simple structure that only electrodes are arranged therein other than the main part, i.e. the element, and thus, the heat may be absorbed at the element and correspondingly, the heat may be radiated from the electrodes distant from the element. On the other hand, the high-frequency oscillator of the high-frequency assist head is in such a complicated structure that the oscillator is interposed between a main magnetic pole and an auxiliary magnetic pole both of which are on a current path of the high-frequency assist head. Furthermore, the main magnetic pole and auxiliary magnetic pole are restricted to a FeCo alloy which exerts high saturation magnetization. Under these circumstances, the efficient cooling of the high-frequency oscillator has been a difficult issue in this technical field.

BRIEF DESCRIPTION OF THE DRAWINGS

FIG. 11 is a schematic sectional view of an example of a structure of the magnetic head of Example 5.

FIG. 12 is a schematic sectional view of an example of a structure of the magnetic head of Example 6.

DETAILED DESCRIPTION

Hereinafter described are the present embodiments with reference to the figures.

Figure 1:
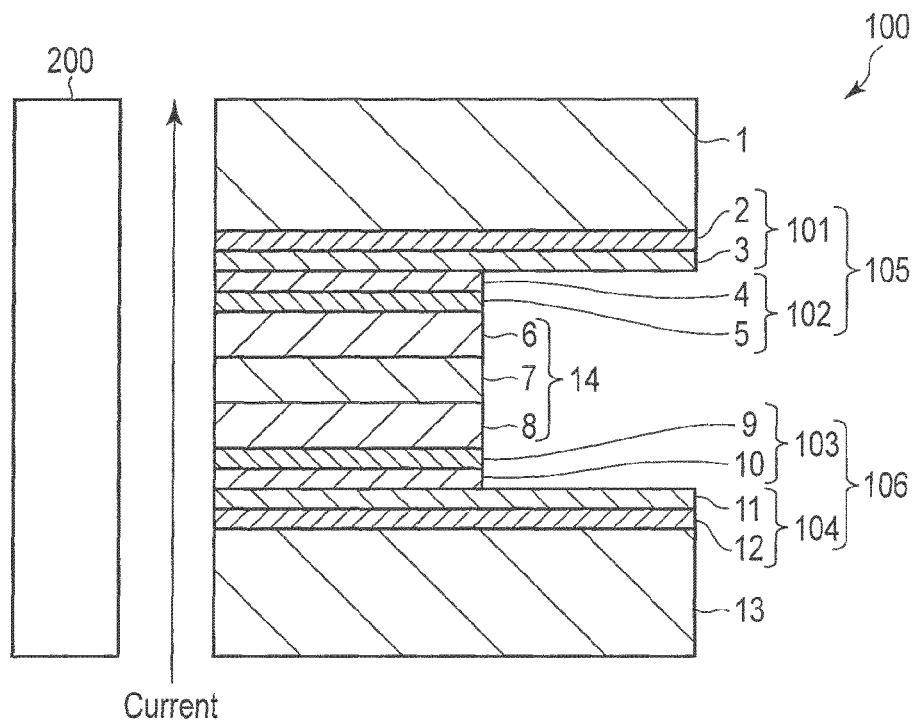
FIG. 1 shows an example of a magnetic head of the present embodiments.

FIG. 1 shows an example of the magnetic head of the present embodiments.

As shown therein, a magnetic head 100 of the present embodiments comprises a main magnetic pole 1 configured to apply a recording magnetic field to a magnetic recording medium 200, an auxiliary magnetic pole 13 configure to structure a magnetic circuit in conjunction with the main magnetic pole 1, and an laminated oscillator 14 interposed between the main magnetic pole 1 and the auxiliary magnetic pole 13 to conduct electricity from the main magnetic pole 1 to the auxiliary magnetic pole 13.

The laminated oscillator 14 has a junction area perpendicular to the current-carrying direction, which is smaller than that of the main magnetic pole 1 and that of the auxiliary magnetic pole 13. In the laminated oscillator 14, layers are laminated one by one from the main magnetic pole 1 side. The laminated oscillator 14 comprises a second magnetic layer 6 whose coercive force is weaker than the magnetic field applied from the main magnetic pole 1 and which functions as an oscillation layer configured to generate a magnetic field by microwave oscillation (a field generation layer; FGL). The laminated oscillator 14 further comprises a first magnetic layer 8 formed of a metal different from that of the second magnetic layer 6 as a spin injection layer (SIL) for injecting a spin transfer torque to the second magnetic layer 6.

A first cooling/heating material 105 is interposed between the laminated oscillator 14 and the main magnetic pole 1. A second cooling/heating material 106 is interposed between the auxiliary magnetic pole 13 and the oscillation player 14.

The first cooling/heating material 105 is layered one by one from the laminated oscillator 14 side and comprises a first thermoelectric material layer 5 having the same junction area as that of the laminated oscillator 14, first metal material layer 4 having the same junction area as that of the laminated oscillator 14, a second metal material layer 3 having the same junction area as that of the main magnetic pole 1, and a second thermoelectric material layer 2 having the same junction area as that of the main magnetic pole 1.

The second cooling/hating material 106 is layered one by one from the auxiliary magnetic pole 13 side and comprises a third metal material layer 12 having the same junction area as that of the auxiliary magnetic pole 13, a third thermoelectric material layer 11 having the same junction area as that of the junction area of the auxiliary magnetic pole 13, a fourth thermoelectric material layer 10 having the same junction area as that of the laminated oscillator 14, and a fourth metal material layer 9 having the same junction area as that of the laminated oscillator 14.

The main part of the high-frequency oscillator of the magnetic head 100 is the laminated oscillator 14 comprising three functional layers of: the first magnetic layer (SIL) 8 configured to inject a spin transfer torque into the first magnetic layer; the second magnetic layer (FGL) 6 configured to generate a magnetic field by microwave oscillation; and the intermediate layer configured to cut the direct magnetic coupling between the first magnetic layer 8 and the second magnetic layer 6. A base layer and a protective layer may optionally be provided above and below the laminated oscillator 14. The layer may be laminated in such an order as "base layer/first magnetic layer (SIL) 8/intermediate layer/second magnetic layer (FGL) 6/protective layer" or as "base layer/second magnetic layer (FGL) 6/intermediate layer/first magnetic layer (SIL) 8/protective layer", and when the current-carrying direction is "from the first magnetic layer (SIL) 8 to the intermediate layer 7 and from the intermediate layer 7 to the second magnetic layer (FGL) 6", the same function of the high-frequency oscillation by the spin transfer torque is obtainable. To obtain the spin transfer torque efficiently, it is desired that the current density be increased. Therefore, the high-frequency oscillator may be patterned as a quadrilateral whose sides are about 100 nm or less.

The laminated oscillator 14 is supported by the main magnetic pole 1 and the auxiliary magnetic pole 13 therebetween and the current is supplied thereto by means of the main magnetic pole 1 and the auxiliary magnetic pole 13 used as electrodes. The junction area with respect to the current-carrying direction of both of the electrodes: the main magnetic pole 1 and the auxiliary magnetic pole 13 is more than approximately ten times as large as that of the laminated oscillator 14.

In the present embodiments, the heat absorption and heat radiation are controlled to achieve an efficient cooling effect of a local point in the laminated oscillator 14 by using a difference between the junction area of the laminated oscillator 14 and that of the electrodes: the main magnetic pole 1 and the auxiliary magnetic pole 13. Specifically, as shown in FIG. 1, heat radiation parts 101 and 104 are formed on the main magnetic pole 1 and the auxiliary magnetic pole 13, respectively and heat absorption parts 102 and 103 are formed on the laminated oscillator 14.

The heat quantity QN by the Peltier effect at each point N can be represented as follows using temperature change $\Delta TN$ and junction area SN.

Taking the heat radiation quantities at the heat radiation parts 101 and 104 as Q1 and Q4, and taking the heat absorption quantities at the heat absorption parts 102 and 103 as Q2 and Q3:

Main magnetic pole: $Q1 \propto \Delta T1 \times S1$
Second magnetic layer (FGL): $Q2 \propto \Delta T2 \times S2$
First magnetic layer (SIL): $Q3 \propto \Delta T3 \times S3$
Auxiliary magnetic pole: $Q4 \propto \Delta T4 \times S4$ and here, the heat absorption quantity and the heat radiation quantity must be proportional to each other in a closed circuit, and therefore the following equation stands.

$$Q1+Q3=Q2+Q4$$

The left part stands for the heat radiation and the right part stands for the heat absorption. Now, since the heat conductivity of the structural elements are acknowledged substantially the same, the heat quantity Q can be separated into the heat temperature $\Delta T$ and the junction area S as follows.

$$\Delta T1 \times S1 + \Delta T3 \times S3 \approx \Delta T2 \times S2 + \Delta T4 \times S4$$

Here, as mentioned above, the junction areas S1 and S4 of the main and auxiliary magnetic poles are more than approximately ten times as large as the junction areas S2 and S3 of the first and second magnetic layers. Therefore, the temperature changes $\Delta T2$ and $\Delta T3$ in the first and second magnetic layers are more than approximately ten times as large as the temperature changes $\Delta T1$ and $\Delta T4$ in the main and auxiliary magnetic poles.

Figure 2:
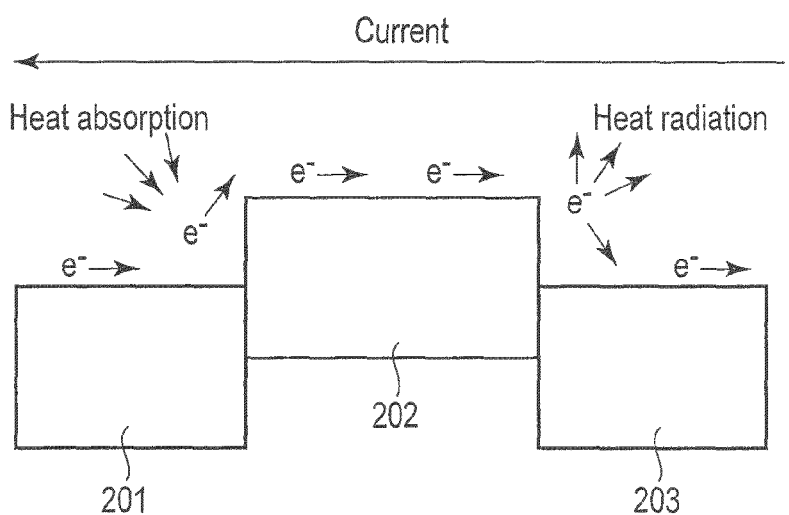
FIG. 2 shows a technical concept of the Peltier effect.

FIG. 2 shows the technical concept of the Peltier effect.

In FIG. 2, both layers 201 and 203 are formed of the same metal material such as Au, and a layer 202 between the layers 201 and 203 is formed of CuNi.

In a laminated layer of a metal material and a thermoelectric material having the same Peltier coefficient H, the heat absorption and the heat radiation are reversed corresponding to the current-carrying direction as shown in FIG. 2. Therefore, in a high-frequency oscillator comprising an auxiliary magnetic pole/oscillation laminated layer/main magnetic pole laminated in this order, when a "metal material/thermoelectric material" layer is applied onto the auxiliary magnetic pole and a "thermoelectric material/metal material" layer which uses the same materials but is laminated in a reversed order is applied below the oscillation laminated layer, a temperature change can simply be enlarged by a difference in the junction areas of the layers.

Furthermore, as long as the code of the Peltier coefficient is the same, each of the laminated layers as "first metal material/first thermoelectric material", "second thermoelectric material/second metal material", "third thermoelectric material/third metal material", and "fourth thermoelectric material/fourth metal material" may be replaced with a combination of the same materials or a combination of different materials.

Each of the first thermoelectric material layer, second thermoelectric material layer, third thermoelectric material layer, and fourth thermoelectric material layer may contain at least one selected from the group consisting of CuNi, Pt, Ni, Co, and Ru by which the Seebeck coefficient becomes negative.

Each of the first metal material layer, second metal material layer, third metal material layer, and fourth metal material layer may contain at least one selected from the group consisting of Cr, Fe, NiFeCr, CoFeCr.

Furthermore, each of the first metal material layer, second metal material layer, third metal material layer, and fourth metal material layer contains at least one metal oxide selected from the group consisting of Cr oxide, Ta oxide, and Cr—Ta oxide and has a thickness of 0.5 nm to 2 nm. Within this range of thickness, the electric resistance of the whole oscillator can be prevented even when there is metal oxide. Here, if the thickness of the first to fourth metal material layers is less than 0.5 nm, a uniform membrane may not be maintained stably, and if the thickness is more than 2 nm, the electric resistance of the oscillator becomes too strong and the Joule heat may become excessively large.

To efficiently cool down the high-frequency oscillator used in the magnetic head, what is important is that the energy corresponding to the heat absorption by the high-frequency oscillator magnetic head is radiated from the main magnetic pole and auxiliary magnetic pole. In the present embodiments, materials exerting high cooling efficiency by the Peltier effect are used in the high-frequency oscillator while materials exerting high heat radiation are used in the part other than the high-frequency oscillator; namely, main magnetic pole and auxiliary magnetic pole, and the like. Therefore, the temperature of the high-frequency oscillator is kept low even in the environment of high working temperature, and the oscillation is not easily deteriorated.

The second magnetic layer 6 (oscillation layer) (FGL) is formed of a magnetic alloy comprising at least one element selected from the group consisting of Fe, Co, Ni. In view of generating a high-frequency magnetic field, using a material having a saturation magnetic flux density (Bs) as high as possible is effective. Therefore, alloys including Fe such as Fe—Co alloy and Fe—Co—Ni alloy are applicable. In that case, the composition ratio of Fe in the alloy may be 30 atomic % or more. Furthermore, the second magnetic layer 6 (FGL) may be structured as a laminated layer of magnetic alloys. The Fe alloy may include the other non-magnetic metal elements. In particular, when an element selected from the group consisting of Al, Si, Cu, Ge, Ga, and Mn is applied to the Fe—Co alloy in a concentration of 30 atomic % or less, the soft magnetic properties can be improved and the damping constant which blocks the spin torque oscillation can be reduced. In view of achieving a high-frequency magnetic field, the FGL should be as thick as possible; however, larger the magnetic volume, harder the spin torque oscillation is generated. Therefore, the thickness of the FGL is suitable within a range from 5 nm to 30 nm.

Furthermore, the non-magnetic intermediate layer 7 may be formed of at least one metal layer selected from the group consisting of Al, Cu, Au, Ag, Pt, Pd, Os, and Ir, or a non-magnetic alloy layer using the same, or a combination of the metal layer and non-magnetic alloy. Since the spin torque from the spin injection layer (SIL) transfers to the FGL, the non-magnetic intermediate layer 7 has its thickness thinner than a spin diffusion length. The spin diffusion length varies depending on material kinds, but it is generally 10 nm or more. Thus, the thickness of the non-magnetic intermediate layer 7 may be set to 10 nm or less. On the other hand, when the thickness of the non-magnetic intermediate layer is thinner than 0.5 nm, the magnetic coupling between the second magnetic layer 6 (FGL) and the first magnetic layer 8 (SIL) becomes stronger and the oscillation is blocked. Therefore, the thickness of the non-magnetic intermediate layer may be set to 5 nm or more.

It is desired that the first magnetic layer 8 (SIL) comprise perpendicular magnetic anisotropy and stably face a direction of a gap magnetic field under the gap magnetic field. On the other hand, it is desired that the first magnetic layer 8 (SIL) face the same direction as that of the gap magnetic field corresponding to the polarity inversion of the gap magnetic field. As the first magnetic layer 8 (SIL), alloys such as Co—Pt alloy and Fe—Pt alloy, or lattices such as Co/Pt artificial lattice, Co/Pd artificial lattice, Co/Ni artificial lattice, and FeCo/Ni artificial lattice can be used. It is desired that the first magnetic layer 8 (SIL) be thicker to stably hold the direction of the magnetization at the time of spin torque oscillation. However, the thickness indeed needs to be as thin as possible because of design constraint of forming the whole laminated oscillator 14 thin. For example, the oscillation will be stable when the thickness is 5 nm or more. Furthermore, a soft magnetic layer may be interposed between the first magnetic layer 8 (SIL) and the non-magnetic intermediate layer. The soft magnetic layer may be a FeCo alloy or a half-metal alloy. With such a soft magnetic layer, the spin torque efficiency is increased while the driving voltage is decreased, and thereby the reliability of oscillation can be improved. On the other hand, when soft magnetic layers are laminated one another, the perpendicular magnetic anisotropy decreases as a whole. Thus, the thickness should be kept within a range which does not decrease the perpendicular magnetic anisotropy remarkably. The suitable thickness of the soft magnetic layer may vary depending on the strength of the perpendicular magnetic anisotropy of and the thickness of the first magnetic layer 8 (SIL); however, certain perpendicular magnetic anisotropy is obtainable as long as it does not exceed the thickness of the first magnetic layer 8 (SIL).

The laminated oscillator 14 has the aforementioned laminated structure and the lamination may be performed in an "SIL/intermediate layer/FGL" order or in an "FGL/intermediate layer/SIL" order.

The laminated oscillator 14 (STO) has the aforementioned laminated structure and is formed on the main magnetic pole 1. The main magnetic pole 1 may also function as an electrode to carry the current in a direction perpendicular to the surface of the laminated oscillator 14.

In forming the laminated oscillator 14, a base is formed firstly to obtain good perpendicular magnetic anisotropy of the first magnetic layer 8 (SIL). As a specific example of the base, Ta of 1 to 10 nm or Ni—Fe—Cr alloy of 2 to 15 nm is laid as a primal layer, and formed on top of that is Al, Pt, Cu, Ru, NiFe, Au, Ag, Pd, Os, or Ir of 1 to 10 nm or alloy or lamination structure thereof.

A return yoke is formed at the upper part of the laminated oscillator 14. The return yoke may also work as an electrode to carry the current in the direction perpendicular to the surface of the laminated oscillator 14.

The return yoke may be coupled with the laminated oscillator 14 directly, or may be laminated thereon via a non-magnetic metal layer. Here, when the FGL is formed at the return yoke side, the magnetic coupling to the return yoke can be reduced with the non-magnetic metal layer. In that case, using the non-magnetic metal layer is advantageous in respect of driving voltage.

After the laminated oscillator 14 has been patterned, a charge layer including an insulator region and a metal region may be charged around the laminated oscillator 14 so that the upper and lower electrodes can apply the current in the direction perpendicular to the surface of the laminated oscillator 14.

Figure 3:
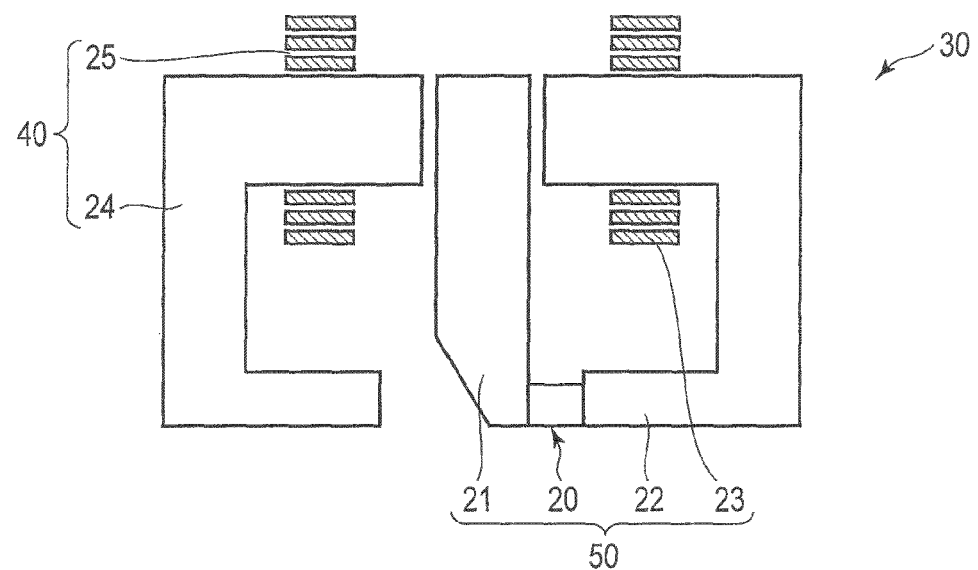
FIG. 3 shows another schematic example of the magnetic head of the present embodiments.

FIG. 3 shows another schematic example of the magnetic head of the present embodiments.

The magnetic head 30 comprises a reproduction head 40 and a writing head 50. The reproduction head 40 comprises a magnetic reproduction element (not shown), energized coil 25, and reading shield 24. The writing head 50 comprises the main magnetic pole 21 as a recording magnetic pole 21, trailing shield 22 (auxiliary magnetic pole 13) configured to return the magnetic field from the main magnetic pole 21, laminated oscillator 20 between the main magnetic pole 21 and the trailing shield 22 (auxiliary magnetic pole 13), and energized coil 23. In the writing head 50 of the high-frequency magnetic field assisted recording head 30, a gap magnetic field between the main magnetic pole 21 and the trailing shield 22 (auxiliary magnetic pole 13) is generated and thereby, an external magnetic field perpendicular to the surface of the laminated oscillator 20. The oscillation layer goes precession around a rotation axis which is approximately perpendicular to the surface and thereby, a high-frequency magnetic field is generated outside. The high-frequency magnetic field generated from the spin torque oscillator is then superposed on the magnetic field applied from the main magnetic pole 21, and therefore, writing in a magnetic recording medium corresponding to higher recording density is performable.

In the present embodiments, a spin torque oscillator whose critical current density is low can be used as a generator of the high-frequency magnetic field. With such a spin torque oscillator, the magnetization of the magnetic recording medium can be reversed by large high-frequency magnetic field.

Figure 4:
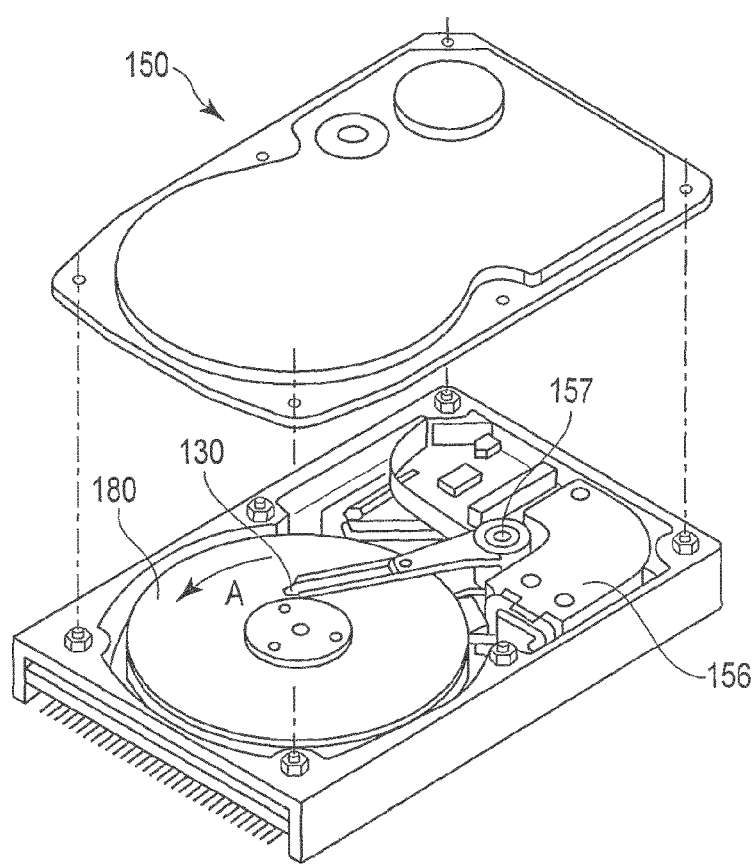
FIG. 4 is an exemplary perspective view showing a schematic structure of a magnetic recording/reproducing apparatus configured to accommodate the magnetic head of the present embodiments.

FIG. 4 is an exemplary perspective view showing a schematic structure of a magnetic recording/reproducing apparatus configured to accommodate the magnetic head of the present embodiments.

The magnetic recording/reproducing apparatus 150 is an apparatus using a rotary actuator. In FIG. 4, a recording medium disk 180 is attached to a spindle 157 and rotates in a direction of arrow A by a motor (not shown) configured to respond to a control signal from a drive mechanism control unit (not shown). The magnetic recording/reproducing apparatus 150 may comprise a plurality of recording medium disks 180.

A head slider 130 configured to reproduce the information recorded in the recording medium disk 180 is, in the aforementioned structure of FIG. 4, attached to a tip of a thin-film-shaped suspension 154. Here, the head slider 130 comprises the magnetic head of the present embodiments at the vicinity of its end portion.

When the recording medium disk 180 rotates, a medium facing surface (ABS) of the head slider 103 is held with a predetermined floating amount from the surface of the medium disk 180. The slider may be a so-called "contact running type" slider that comes in contact with the medium disk 180.

The suspension 154 is connected to one end of an actuator arm 155 including a bobbin holding a driving coil (not shown). A voice coil motor 156 as a kind of a linear motor is formed at the other end of the actuator arm 155. The voice coil motor 156 includes the driving coil (not shown) wound around the bobbin of the actuator arm 155, and a magnetic circuit including a permanent magnet and counter yoke arranged to oppose each other so as to sandwich the coil.

The actuator arm 155 is held by ball bearings (not shown) formed in two, upper and lower portions of the spindle 157, and freely rotated by the voice coil motor 156.

Figure 5:
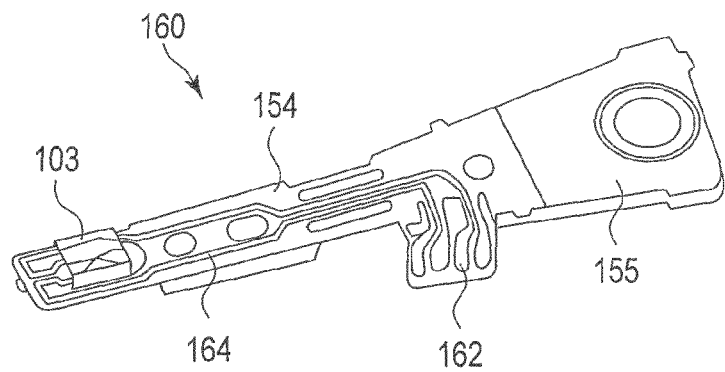
FIG. 5 is a schematic view showing an example of a magnetic head assembly of the present embodiments.

FIG. 5 is a schematic view showing an example of a magnetic head assembly of the present embodiments.

FIG. 5 is an enlarged perspective view of a magnetic head assembly formed ahead of the actuator arm 155 is when viewed from the disk side. That is, a magnetic head assembly 160 includes the actuator arm 155 including the bobbin holding, for example, the driving coil, and the suspension 154 is connected to one end of the actuator arm 155.

The head slider 103 including the magnetic recording head 30 shown in FIG. 4 is attached to the distal end of the suspension 154. The suspension 154 includes lead wires 164 for signal write and read. The lead wires 164 are electrically connected to electrodes of the magnetic head assembled in the head slider 103. Reference numeral 162 in FIG. 5 denotes electrode pads of the magnetic head assembly 160.

Example 1

Figure 6:
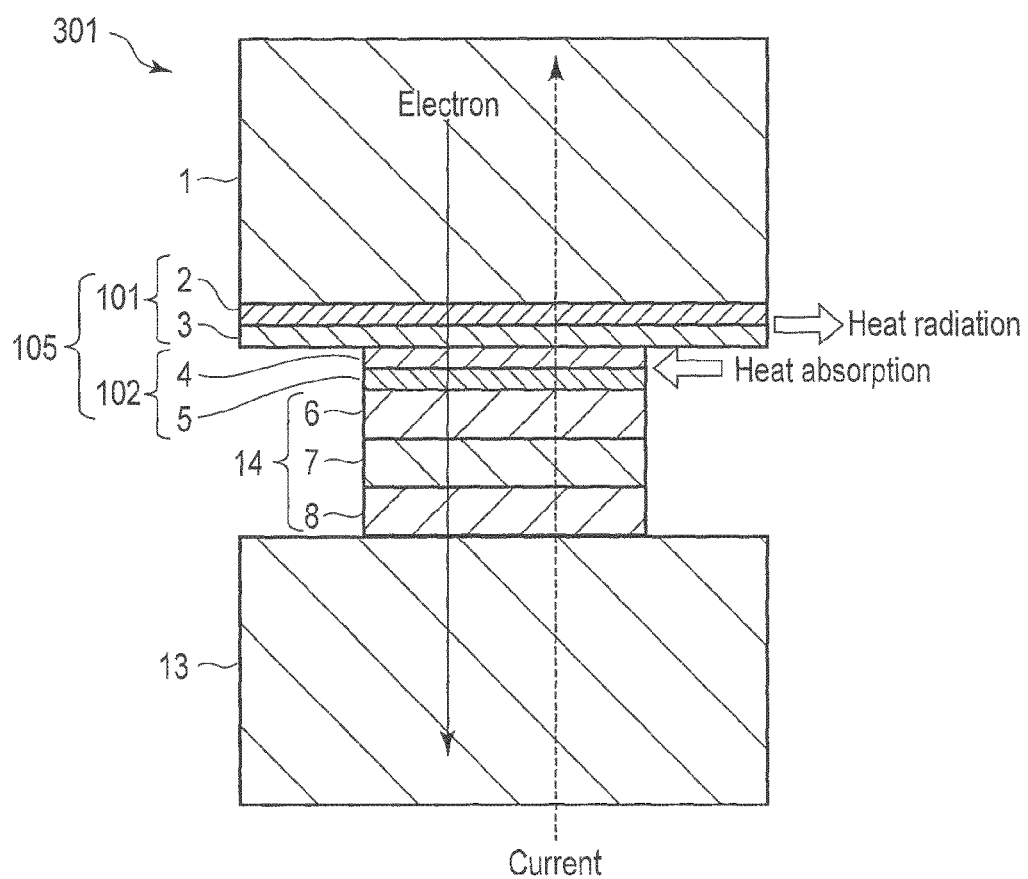
FIG. 6 is a schematic sectional view showing an example of a structure of the magnetic head of Example 1.

FIG. 6 is a schematic sectional view showing an example of a structure of the magnetic head of Example 1.

As shown in FIG. 6, the magnetic recording head 301 of Example 1 comprises a main magnetic pole 1 configured to apply a recording magnetic field to a magnetic recording medium, an auxiliary magnetic pole 13 configure to structure a magnetic circuit in conjunction with the main magnetic pole 1, and an laminated oscillator 14 interposed between the main magnetic pole 1 and the auxiliary magnetic pole 13 to conduct electricity from the main magnetic pole 1 to the auxiliary magnetic pole 13.

The laminated oscillator 14 has a junction area perpendicular to the current-carrying direction, which is smaller than that of the main magnetic pole 1 or that of the auxiliary magnetic pole 13. In the laminated oscillator 14, layers are laminated one by one from the main magnetic pole 1 side. The laminated oscillator 14 comprises a second magnetic layer (FGL) 6 whose coercive force is weaker than the magnetic field applied from the main magnetic pole 1. The laminated oscillator 14 further comprises a first magnetic layer (SIL) 8 formed of a metal different from that of the second magnetic layer 6.

A first cooling/heating material 105 is provided between the laminated oscillator 14 and the main magnetic pole 1.

The first cooling/heating material 105 includes, in order from the laminated oscillator 14 side, a first thermoelectric material layer 5 having the same junction area as that of the laminated oscillator, a first metal material layer 4 having the same junction area as that of the laminated oscillator 14, a second metal material layer 3 having the same junction area as that of the main magnetic pole 1, and a second thermoelectric layer 2 having the same junction area as that of the main magnetic pole 1.

In the magnetic recording head 301, the first magnetic layer (SIL) 8 is provided on the auxiliary magnetic pole 13 side, and the second magnetic layer 6 (FGL) is provided on the main magnetic pole 1 side. In that case, the current is supplied in the direction from the auxiliary magnetic pole 13 to the main magnetic pole 1. The following table 1 shows a specific structure of the laminated oscillator 14.

In Example 1, the Peltier effect materials were arranged in such a manner that the laminated oscillator 14 be cooled down in this current-carrying direction.

Note that, Comparative Example 1 was manufactured as a magnetic recording head having the same structure as that of Example 1 except that the first cooling/heating material 105 was not provided.

TABLE 1

| | Laminated oscillator | | | | | Main magnetic pole side | |
|---|---|---|---|---|---|---|---|
| | Base layer | First magnetic layer (SIL) | Intermediate layer | Second magnetic layer (FGL) | Protective layer | Cooling material | Heating material |
| Comparative Example 1 | Ta3 nm/ Pt2 nm | [Co0.4 nm/Pt3 nm] * 15/ FeCo2 nm | Cu3 nm | [FeCo1.6 nm/ Ni4 nm] * 8 | Cu1 nm/Ta2 nm/ Cu25 nm/Ta5 nm | NA | NA |
| Example 1 | Ta3 nm/ Pt2 nm | [Co0.4 nm/Pt0.3 nm] * 15/ FeCo2 nm | Cu3 nm | [FeCo1.6 nm/ Ni4 nm] * 8 | Cu1 nm/Ta4 nm | CuNi5 nm/ Au20 nm | Au5 nm/ CuNi5 nm |

In the above table, a description "CuNi5 nm/Au20 nm" means a layer in which Au of 20 nm and CuNi of 5 nm are laminated on each other. Furthermore, a description "[Cu0.4 nm/Pt3 nm]*15/FeCo2 nm" means a layer in which fifteen Cu0.4 nm/Pt3 nm layers are laminated on one another and a FeCo2 nm layer is put thereon.

In Example 1, the heat absorption part 102 (which correspond to "first thermoelectric material layer 5/first metal material layer 4") having the same junction area as that of the laminated oscillator 14 was located immediately above the laminated oscillator 14. Here, the first thermoelectric material layer 5 was a CuNi alloy and the first material layer 4 was an Au alloy. Current runs from the first thermoelectric material layer 5 to the first metal material layer 4 to absorb heat. This process exhibits a cooling effect. Furthermore, the heat radiation part 101 (which corresponds to "second metal material layer 2/second thermoelectric material layer 3") having the same junction area as that of the main magnetic pole 1 was located immediately above the main magnetic pole 1. Here, the second metal material layer 2 was an Au alloy and the second thermoelectric material layer 3 was a CuNi alloy. The current runs from the second thermoelectric material layer 3 to the second metal material layer 2 to radiate heat. This process exhibits a heating effect. Note that both base layer and protective layer are omitted from FIG. 6.

Then, in the high-frequency oscillator of each magnetic recording head, an electric resistance (R)-applied voltage (V) characteristic was measured.

Figure 7:
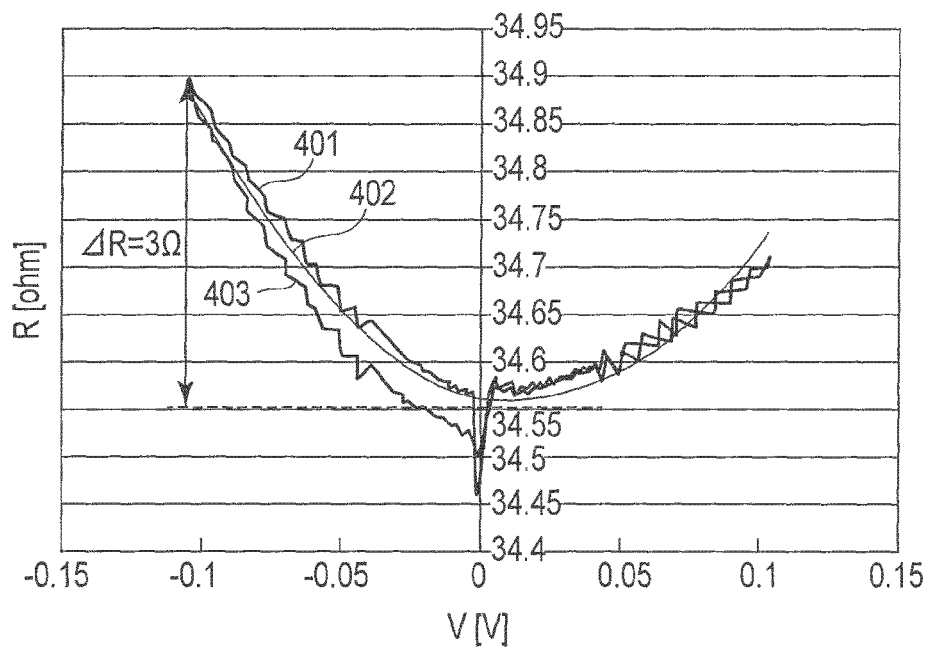
FIG. 7 is an example of R-V curve of Example 1.

An example of R-V curve of Example 1 is shown in FIG. 7.

Figure 8:
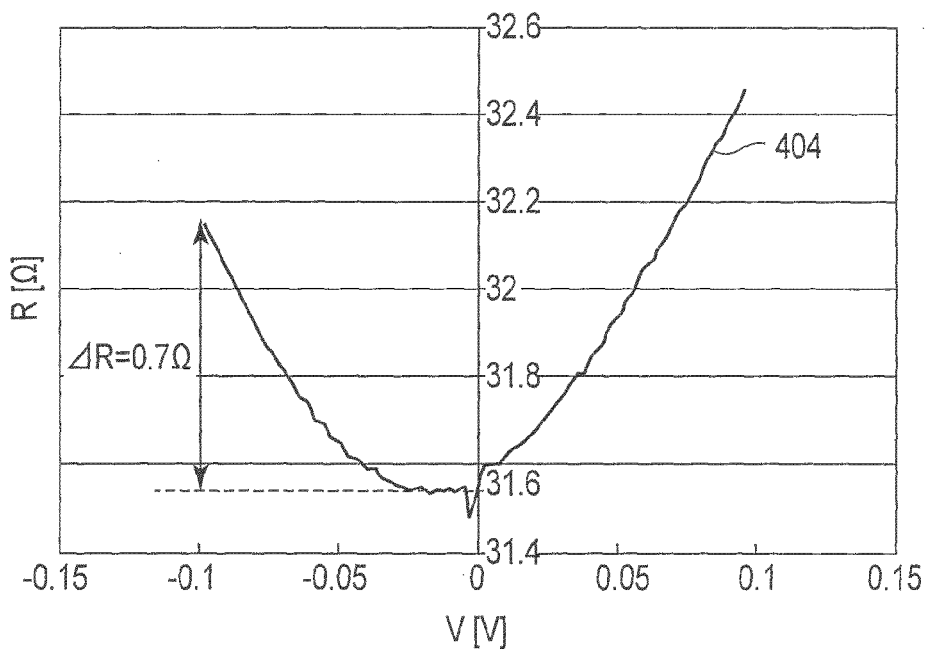
FIG. 8 is an example of R-V curve of Comparative Example 1.

An example of R-V curve of Comparative Example 1 is shown in FIG. 8.

In FIG. 7, data 401 indicates that the Joule heat is generated with the increase of current and the electric resistance R of the laminated oscillator 14 increases corresponding to the rising temperature. Data 403 indicates that the Joule heat is reduced with the decrease of current and the electric resistance R of the laminated oscillator 14 decreases corresponding to the lowering temperature. The electric resistance of the laminated oscillator is reverse to the increase and decrease of current.

In FIG. 8, data 404 indicates that the Joule heat is generated with the increase of current and the electric resistance R of the laminated oscillator 14 increases corresponding to the rising temperature.

Here, the current-carrying direction in the oscillation, that is, the current running from the first magnetic layer (SIL) to the second magnetic layer (FGL) is indicated as negative. The electric resistance at the time when no voltage is applied is defined as R0, and the electric resistance of the high-frequency oscillator at certain voltage is defined as R, the increase amount ΔR by the applied voltage can be represented by the following equation.

$$\Delta R = R - R_0 \propto RI^2 - \Pi I$$

In FIG. 7, data 402 is the data 401 fitted by the above equation. Here, "$RI^2$" is the electric resistance increased by the Joule heat, "$\Pi I$" is the electric resistance change corresponding to the temperature change by the Peltier effect. The sum of the electric resistance increase and the electric resistance change is measured as the actual electric resistance of the oscillator.

Thus, between the oscillators having the same size but different layer structure, when ΔRs at certain voltage as shown in FIGS. 7 and 8 are compared with each other, the amount of heat absorption and heat radiation by the Peltier effect based on the layer structure of each oscillator can be determined. When ΔR is lower, the cooling effect of the Peltier effect becomes stronger.

Now, between Comparative Example 1 and Example 1, ΔRs were compared to each other at the voltage of −100 mV which was necessary for the high-frequency oscillation. Comparative Example 1 indicated ΔR=0.7Ω as shown in FIG. 8 and Example 1 indicated ΔR=0.3Ω as shown in FIG. 7. The following Table 2 indicates the measurement results obtained from a plurality of oscillators.

TABLE 2

| | ΔR @-100 mV | Average value ΔRave @-100 mV |
|---|---|---|
| Comparative Example 1 | 0.30~1.10Ω | 0.7Ω |
| Example 1 | 0.25~0.35Ω | 0.3Ω |

As can be understood from the above, ΔR of Example 1 is clearly smaller than that of Comparative Example 1 even when the range of variation is taken into consideration. This means that the heat absorption by the Peltier effect in Example 1 successfully lowered the temperature of the laminated oscillator. Furthermore, the electric resistance was measured by changing the environmental temperature of the oscillator for checking a correspondence between the electric resistance and oscillator temperature. The result indicated that ΔR=0.77Ω corresponds to ΔT=78° C. From this point, it leads to the conclusion that the oscillator temperature rises by about 70° C. in Comparative Example 1 while the oscillator temperature only rises by about 30° C. in Example 1.

As evident from the above, it was acknowledged that, when the laminated layer exerting the Peltier effect was inserted into the oscillator, the cooling effect was obtainable.

Examples 2 and 3

Figure 9:
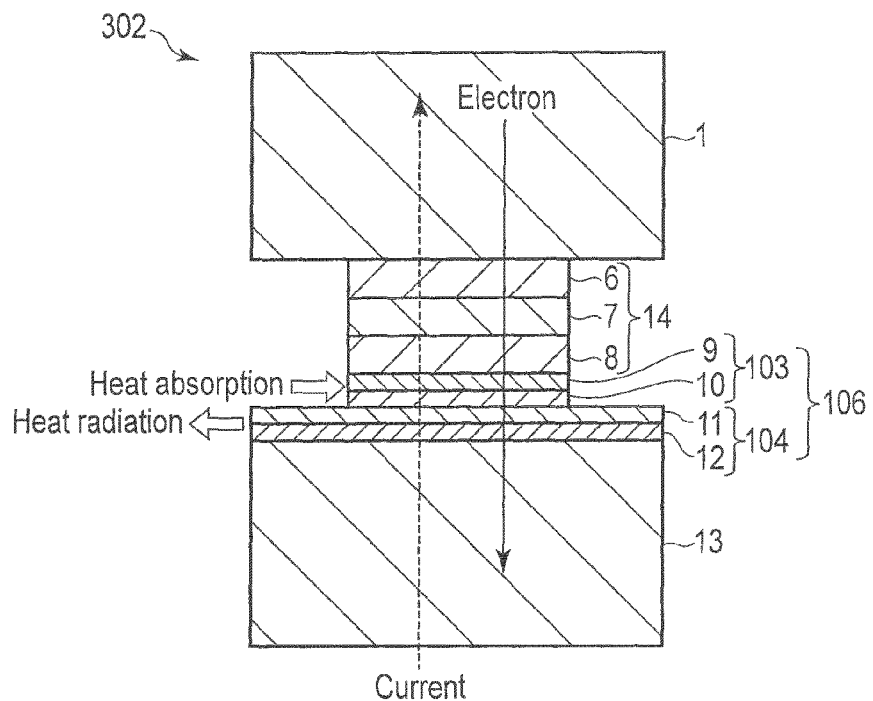
FIG. 9 is a schematic sectional view showing an example of a structure of the magnetic head of Example 2.

FIG. 9 is a schematic sectional view showing an example of a structure of the magnetic head of Example 2.

Furthermore, an example of a structure of the magnetic head of Example 3 is the same as that of FIG. 1.

The magnetic recording head 302 of Example 2 has the same structure as that of FIG. 6 except that a second cooling/heating material 106 exerting the Peltier effect is interposed between the laminated oscillator 14 and the auxiliary magnetic pole 13 instead of the first cooling/heating material 105 between the laminated oscillator 14 and the main magnetic pole 1.

The second cooling/heating material 106 comprises the heat absorption part 103 and the heat radiation part 104.

The heat radiation part 104 (which corresponds to "third metal material layer 12/third thermoelectric material layer 11") having the same junction area as that of the auxiliary magnetic pole 13 was located above the auxiliary magnetic pole 13. Here, the third thermoelectric material layer 11 was a CuNi alloy and the third metal material layer 12 was an Au alloy. Current runs from the third metal material layer 12 to the third thermoelectric material layer 11 to radiate heat. Furthermore, the heat absorption part 103 (which corresponds to "fourth metal material layer 9/fourth thermoelectric material layer 10") having the same junction area as that of the laminated oscillator 14 was located below the laminated oscillator 14. Here, the fourth metal material layer 9 was an Au alloy and the fourth thermoelectric material layer 10 was a CuNi alloy.

The magnetic recording head of Example 3 is a combination of Examples 1 and 2. The magnetic recording head of Example 3 has the same structure as that of FIG. 6 except that the second cooling/heating material 106 exerting the Peltier effect is further interposed between the laminated oscillator 14 and the auxiliary magnetic pole 13. As the layers exerting the Peltier effect, the magnetic recording head of Example 3 comprises the second cooling/heating material 106 interposed between the laminated oscillator 14 and the auxiliary magnetic pole 13 and the first cooling/heating material 105 interposed between the laminated oscillator 14 and the main magnetic pole 1.

The following Table 3 indicates specific structures.

Figure 10:
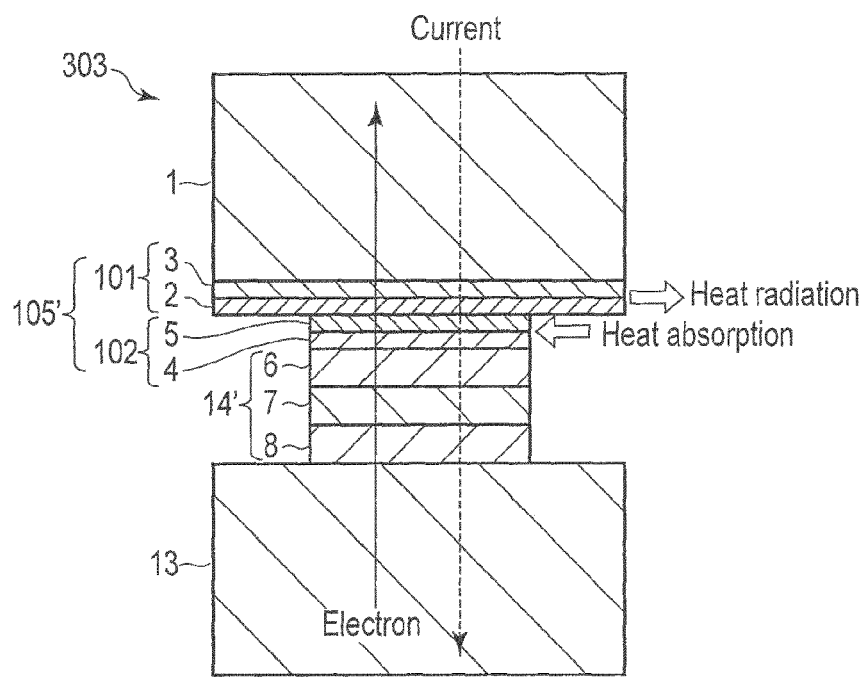
FIG. 10 is a schematic sectional view of an example of a structure of the magnetic head of Example 4.

As shown in FIG. 10, the magnetic recording head 303 of Example 4 comprises a main magnetic pole 1 configured to apply a recording magnetic field to a magnetic recording medium, an auxiliary magnetic pole 13 configure to structure a magnetic circuit in conjunction with the main magnetic pole 1, and an laminated oscillator 14 interposed between the main magnetic pole 1 and the auxiliary magnetic pole 13 to conduct electricity from the main magnetic pole 1 to the auxiliary magnetic pole 13.

The laminated oscillator 14 has a junction area perpendicular to the current-carrying direction, which is smaller than that of the main magnetic pole 1 and that of the auxiliary magnetic pole 13. In the laminated oscillator 14, layers are laminated one by one from the main magnetic pole 1 side. The laminated oscillator 14 comprises the following layers in the following order: a second magnetic layer 6 whose coercive force is weaker than the magnetic field applied from the main magnetic pole 1 and which functions as an oscillation layer configured to generate a magnetic field by microwave oscillation; a first magnetic layer 8 formed of a metal different from that of the second magnetic layer 6 and configured to inject a spin transfer torque to the second magnetic layer 6; and a non-magnetic intermediate layer 7 configured to cut a direct magnetic coupling between the first magnetic layer 8 and the second magnetic layer 6.

A cooling/heating material 105' is provided between the laminated oscillator 14 and the main magnetic pole 1.

The first cooling/heating material 105' includes the following layers laminated from the laminated oscillator 14 side in the following order: a first metal material layer 4 having the same junction area as that of the laminated oscillator 14; a first thermoelectric material layer 5 having the same junction area as that of the laminated oscillator 14; a second thermoelectric material layer 2 having the same junction area as that of the main magnetic pole 1; and a second metal material layer 3 having the same junction area as that of the main magnetic pole 1.

TABLE 3

| | Auxiliary magnetic pole side Heating material | Laminated oscillator | | | | | | | Main magnetic pole side Heating material |
|---|---|---|---|---|---|---|---|---|---|
| | | Cooling material | Base | First magnetic layer (SIL) | Intermediate layer | Second magnetic layer (FGL) | Protective Layer | Cooling material | |
| Example 2 | Au20 nm/ CuNi5 nm | CuNi5 nm/ Au5 nm | Ta3 nm/ Pt2 nm | [Co4 nm/Pt0.3 nm] * 15/ FeCo2 nm | Cu3 nm | [FeCo1.6 nm/ Ni0.4 nm] * 8 | Cu1 nm/Ta2 nm/ Cu25 nm/Ta5 nm | NA | NA |
| Example 3 | Au20 nm/ CuNi5 nm | CuNi5 nm/ Au5 nm | Ta3 nm/ Pt2 nm | [Co0.4 nm/Pt0.3 nm] * 15/ FeCo2 nm | Cu3 nm | [FeCo1.6 nm/ Ni0.4 nm] * 8 | Cu1 nm/Ta4 nm | CuNi5 nm/ Au20 nm | |

The increase in the electric resistance at −100 mV in each of Examples 2 and 3 was $\Delta R_{ave}$=0.3Ω and 0.1Ω, respectively. That is, it leads to the conclusion that the increase in temperature of the high-frequency oscillator was about 30° C. in Example 2 and about 10° C. in Example 3 which were remarkably lower than the increase of 70° C. of Comparative Example 1.

Examples 4, 5 and 6

FIG. 10 is a schematic sectional view of an example of a structure of the magnetic head of Example 4.

FIG. 11 is a schematic sectional view of an example of a structure of the magnetic head of Example 5.

FIG. 12 is a schematic sectional view of an example of a structure of the magnetic head of Example 6.

In the magnetic recording head 303, the laminated oscillator 14 has a structure in which the second magnetic layer (FGL) is provided at the auxiliary magnetic pole 13 side and the first magnetic layer (SIL) is provided at the main magnetic pole 1 side. In this structure, the Peltier cooling effect is acknowledged. In that case, the current-carrying direction is from the main magnetic pole 1 to the auxiliary magnetic pole which is a direction reverse to those of Examples 1 to 3.

In a magnetic recording head 303 in Example 4, a heat absorption part 102' (which corresponds to "first metal material layer 4/first thermoelectric material layer 5") having the same junction area as that of the laminated oscillator 14 was located immediately above the laminated oscillator 14. Here, the first thermoelectric material layer 5 was a CuNi alloy and the first metal material layer 4 is an Au alloy. Current runs from the first thermoelectric material layer 5 to the first metal material layer 4 to absorb heat. This process exhibits the cooling effect. Furthermore, a heat radiation part 101' (which corresponds to "second thermoelectric material layer 2/second metal material layer 3") was located below the main magnetic pole 1. The second metal material layer 3 was an Au alloy and the second thermoelectric material layer 2 was a CuNi alloy.

material 106' exerting the Peltier effect were interposed between the laminated oscillator 14 and main magnetic pole 1 and the auxiliary magnetic pole 13 and laminated oscillator 14, respectively, in Example 6.

Here, Comparative Example 2 is a magnetic recording head having the same structure as that of Example 4 except that the first cooling/heating material 105' is not provided.

The following Table 4 indicates specific structures.

TABLE 4

| | Auxiliary magnetic pole side Heating material | Laminated oscillator | | | | | | Main magnetic pole side Heating material |
|---|---|---|---|---|---|---|---|---|
| | | Cooling material | Base | Second magnetic layer (FGL) | Intermediate layer | First magnetic layer (SIL) | Protective Layer | Cooling material |
| Comparative Example 2 | NA | NA | Ta3 nm/ Cu2 nm | [FeCo1.6 nm/ Ni0.4 nm] * 8 | Cu3 nm | [Co0.4 nm/Pt0.3 nm] * 15/ FeCo2 nm | Cu1 nm/Ta2 nm/ Cu25 nm/Ta5 nm | NA | NA |
| Example 4 | NA | NA | Ta3 nm/ Cu2 nm | [FeCo1.6 nm/ Ni0.4 nm] * 8 | Cu3 nm | [Co0.4 nm/Pt0.3 nm] * 15/ FeCo2 nm | Cu1 nm/Ta4 nm | Au20 nm/ CuNi5 nm | CuNi5 nm/ Au5 nm |
| Example 5 | CuNi5 nm/ Au20 nm | Au5 nm/ CuNi5 nm | Ta3 nm/ Cu2 nm | [FeCo1.6 nm/ Ni0.4 nm] * 8 | Cu3 nm | [Co0.4 nm/Pt0.3 nm] * 15/ FeCo2 nm | Cu1 nm/Ta2 nm/ Cu25 nm/Ta5 nm | NA | NA |
| Example 6 | CuNi5 nm/ Au20 nm | Au5 nm/ CuNi5 nm | Ta3 nm/ Cu2 nm | [FeCo1.6 nm/ Ni0.4 nm] * 8 | Cu3 nm | [Co0.4 nm/Pt0.3 nm] * 15/ FeCo2 nm | Cu1 nm/Ta4 nm | Au20 nm/ CuNi5 nm | CuNi5 nm/ Au5 nm |

The order of lamination of the heat absorption part 102' is reverse to that of the heat absorption part 102. Similarly, the order of lamination of the heat radiation part 104' is reverse to that of the heat radiation part 104.

The current runs from the second metal material layer 3 to the second thermoelectric material layer 2 to radiate heat.

A magnetic recording head 304 of Example 5 is structured the same as that of Example 4 except that the second cooling/heating material 106' exerting the Peltier effect is interposed between the laminated oscillator 14 and the auxiliary magnetic pole 13 instead of the cooling/heating material between the laminated oscillator 14 and the main magnetic pole 1. The heat radiation part 104' (which corresponds to "third thermoelectric material layer 11/third metal material layer 12") having the same junction area as that of the auxiliary magnetic pole 13 was located above the auxiliary magnetic pole 13. Here, the third thermoelectric material layer was a CuNi alloy, and the third metal material layer 12 was an Au alloy. The current runs from the third metal material layer 12 to the third thermoelectric material layer 11 to radiate heat. Furthermore, the heat absorption part 103' (which corresponds to "fourth thermoelectric material layer 10/fourth metal material layer 9") having the same junction area as that of the laminated oscillator 14 was located below the laminated oscillator 14. Here, the fourth metal material layer 9 was an Au alloy and the fourth thermoelectric material layer 10 was a CuNi alloy. The current runs from the fourth thermoelectric material layer 10 to the fourth metal material layer 9 to absorb heat.

A magnetic recording head 305 of Example 6 is a combination of Examples 4 and 5 and has the same structure as that of Example 4 except that a second cooling/heating material 106' is further interposed between the auxiliary magnetic pole 13 and the laminated oscillator 14 as a layer exerting the Peltier effect.

Specifically, the first cooling/heating material 105' exerting the Peltier effect was interposed between the laminated oscillator 14 and the main magnetic pole 1 in Example 4, the second cooling/heating material 106' exerting the Peltier effect was interposed between the auxiliary magnetic pole 13 and the laminated oscillator 14 in Example 5, and both first cooling/heating material 105' and second cooling/heating The increase in the electric resistance at −100 mV in each of Comparative Example 2, and Examples 4, 5 and 6 was $\Delta R_{ave}$=0.7, 0.3Ω, 0.3Ω and 0.1Ω, respectively. That is, it leads to the conclusion that the increase in temperature of the high-frequency oscillator was about 70° C. in Comparative Example 2, about 30° C. in Example 4, about 30° C. in Example 5, and about 10° C. in Example 6. Thus, it is acknowledged that Examples 4, 5 and 6 with the Peltier effect material exhibit higher cooling effect than the 70° C. increase of Comparative Example 2.

As can be understood from the above, by inserting a material exerting the Peltier effect into a high-frequency oscillator, the cooling effect to cancel the Joule heat in the oscillator can be achieved. This is not limited to the Peltier cooling effect for the laminated oscillator but also applicable to a cooling effect for a local point in the laminated oscillator when a closed circuit including materials and structure of a main magnetic pole and an auxiliary magnetic pole which are essential for a high-frequency oscillator is located at the heat radiation side.

To reconfirm the necessity for consideration of the materials and structure of the main magnetic pole and the auxiliary magnetic pole, the following Comparative Example 3 and Comparative Example 4 were prepared.

Figure 13:
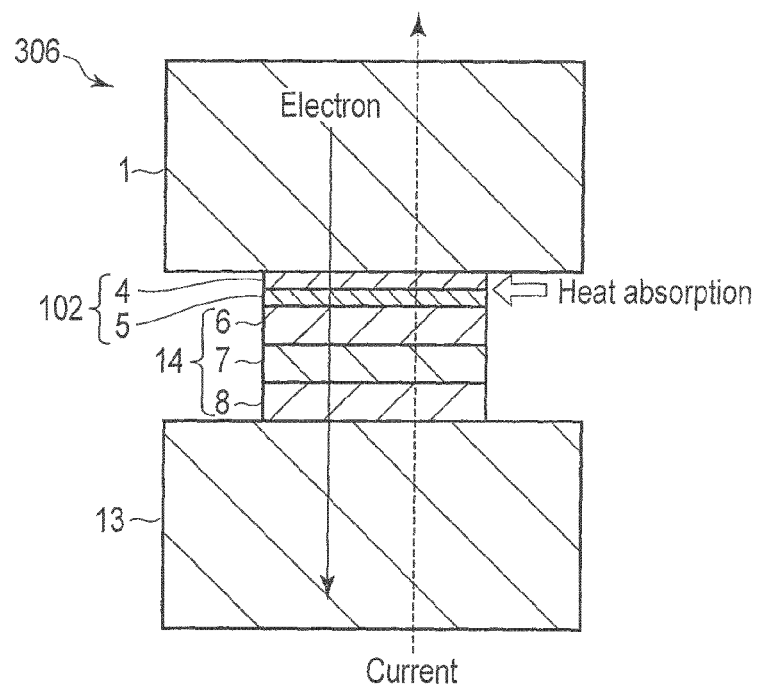
FIG. 13 is a schematic sectional view of an example of a structure of a comparative magnetic head.
Figure 14:
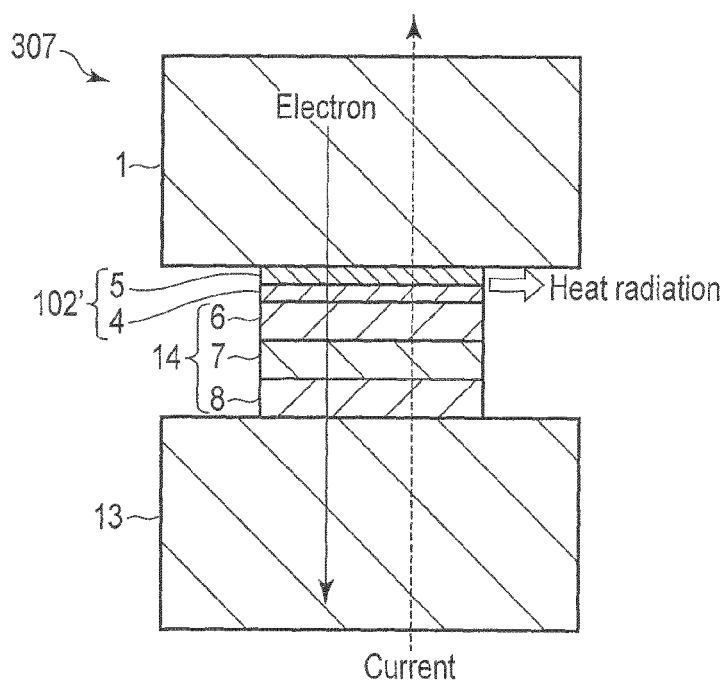
FIG. 14 is a schematic sectional view of another example of the structure of the comparative magnetic head.

FIG. 13 shows a cross-sectional view of a structure of Comparative Example 3 and FIG. 14 shows a cross-sectional view of a structure of Comparative Example 4.

A magnetic recording head 306 of Comparative Example 3 has the same structure as that of Comparative Example 1 except that the first thermoelectric material layer 5 and the first metal material layer 4, which have the same junction area as that of the laminated oscillator and function as a heat absorption part, are laminated from the laminated oscillator 14 side in this order and interposed between the laminated oscillator 14 and the main magnetic pole 1. A magnetic recording head 307 of Comparative Example 4 has the same structure as that of Comparative Example 1 except that the first metal material layer 4 and the first thermoelectric material layer 5, which have the same junction area as that of the laminated oscillator and function as a heat absorption part, are laminated from the laminated oscillator 14 side in this order and interposed between the laminated oscillator 14 and the auxiliary magnetic pole 1. In these Comparative Examples, when current was supplied from the main magnetic pole 1 to the auxiliary magnetic pole 13, the electric resistance change $\Delta r_{ave}$ by the Peltier effect detected in each Comparative Example was substantially equal to that of Comparative Example 1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic recording head comprising:
a main magnetic pole configured to apply a recording magnetic field to a magnetic recording medium;
an auxiliary magnetic pole configured to structure a magnetic circuit in conjunction with the main magnetic pole; and
a laminated oscillator between the main magnetic pole and auxiliary magnetic pole, the laminated oscillator configured to supply current from the main magnetic pole to the auxiliary magnetic pole,
wherein the laminated oscillator has a junction area perpendicular to a current-carrying direction, which is smaller than that of the main magnetic pole,
the laminated oscillator includes the following layers laminated from the main magnetic pole side in the following order; a second magnetic layer having a coercive force smaller than a magnetic field applied from the main magnetic pole and having a magnetic field generated by micro wave oscillation, a first magnetic layer formed of a metal different from that of the second magnetic layer and configured to inject spin transfer torque into the second magnetic layer, and a non-magnetic intermediate layer configured to cut a direct magnetic coupling between the first magnetic layer and the second magnetic layer,
a cooling/heating material is interposed between the laminated oscillator and the main magnetic pole, and
the cooling/heating material includes the following layers laminated from the laminated oscillator side in the following order;
a first thermoelectric material layer having the same junction area as that of the laminated oscillator,
a first metal material layer having the same junction area as that of the laminated oscillator,
a second metal material layer having the same junction area as that of the main magnetic pole, and
a second thermoelectric material layer having the same junction area as that of the main magnetic pole.

2. The magnetic recording head of claim 1, wherein each of the first and second thermoelectric material layers comprises at least one selected from the group consisting of CuN, Pt, Ni, Co, and Ru.

3. The magnetic recording head of claim 1, wherein each of the first and second metal material layers comprises at least one selected from the group consisting of Cr, Fe, NiFeCr, and CoFeCr.

4. The magnetic recording head of claim 1, wherein each of the first and second metal material layers comprises at least one selected from the group consisting of Cr oxide, Ta oxide, and Cr—Ta oxide, and has a thickness of 0.5 nm to 2 nm.

5. A magnetic recording head comprising:
a main magnetic pole configured to apply a recording magnetic field to a magnetic recording medium;
an auxiliary magnetic pole configured to structure a magnetic circuit in conjunction with the main magnetic pole; and
a laminated oscillator between the main magnetic pole and auxiliary magnetic pole, the laminated oscillator configured to supply current from the main magnetic pole to the auxiliary magnetic pole,
wherein the laminated oscillator has a junction area perpendicular to a current-carrying direction, which is smaller than that of the main magnetic pole,
the laminated oscillator includes the following layers laminated from the main magnetic pole side in the following order; a second magnetic layer having a coercive force smaller than a magnetic field applied from the main magnetic pole and having a magnetic field generated by micro wave oscillation, a first magnetic layer formed of a metal different from that of the second magnetic layer and configured to inject spin transfer torque into the second magnetic layer, and a non-magnetic intermediate layer configured to cut a direct magnetic coupling between the first magnetic layer and the second magnetic layer,
a cooling/heating material is interposed between the auxiliary magnetic pole and the laminated oscillator, and
the cooling/heating material includes the following layers laminated from the auxiliary magnetic pole side in the following order;
a third metal material layer having the same junction area as that of the auxiliary magnetic pole,
a third thermoelectric material layer having the same junction area as that of the auxiliary magnetic pole,
a fourth thermoelectric material layer having the same junction area as that of the laminated oscillator, and
a fourth metal material layer having the same junction area as that of the laminated oscillator.

6. The magnetic recording head of claim 5, wherein each of the third and fourth thermoelectric material layers comprises at least one selected from the group consisting of CuN, Pt, Ni, Co, and Ru.

7. The magnetic recording head of claim 5, wherein each of the third and fourth metal material layers comprises at least one selected from the group consisting of Cr, Fe, NiFeCr, and CoFeCr.

8. The magnetic recording head of claim 5, wherein each of the third and fourth metal material layers comprises at least one selected from the group consisting of Cr oxide, Ta oxide, and Cr—Ta oxide, and has a thickness of 0.5 nm to 2 nm.

9. A magnetic recording head comprising:
a main magnetic pole configured to apply a recording magnetic field to a magnetic recording medium;
an auxiliary magnetic pole configured to structure a magnetic circuit in conjunction with the main magnetic pole; and
a laminated oscillator between the main magnetic pole and auxiliary magnetic pole, the laminated oscillator configured to supply current from the main magnetic pole to the auxiliary magnetic pole,
wherein the laminated oscillator has a junction area perpendicular to a current-carrying direction, which is smaller than that of the main magnetic pole,
the laminated oscillator includes the following layers laminated from the main magnetic pole side in the following order; a second magnetic layer having a coercive force smaller than a magnetic field applied from the main magnetic pole and having a magnetic field generated by micro wave oscillation, a first magnetic layer formed of a metal different from that of the second magnetic layer and configured to inject spin transfer torque into the second magnetic layer, and a non-magnetic intermediate layer configured to cut a direct magnetic coupling between the first magnetic layer and the second magnetic layer, a first cooling/heating material is interposed between the laminated oscillator and the main magnetic pole, and a second cooling/heating material is interposed between the auxiliary magnetic pole and the laminated oscillator, the first cooling/heating material includes the following layers laminated from the laminated oscillator side in the following order;

a first thermoelectric material layer having the same junction area as that of the laminated oscillator, a first metal material layer having the same junction area as that of the laminated oscillator, a second metal material layer having the same junction area as that of the main magnetic pole, and a second thermoelectric material layer having the same junction area as that of the main magnetic pole, and the second cooling/heating material includes the following layers laminated from the auxiliary magnetic pole side in the following order;

a third metal material layer having the same junction area as that of the auxiliary magnetic pole, a third thermoelectric material layer having the same junction area as that of the auxiliary magnetic pole, a fourth thermoelectric material layer having the same junction area as that of the laminated oscillator, and a fourth metal material layer having the same junction area as that of the laminated oscillator.

10. The magnetic recording head of claim 9, wherein each of the first to fourth thermoelectric material layers comprises at least one selected from the group consisting of CuN, Pt, Ni, Co, and Ru.

11. The magnetic recording head of claim 9 wherein each of the first to fourth metal material layers comprises at least one selected from the group consisting of Cr, Fe, NiFeCr, and CoFeCr.

12. The magnetic recording head of claim 9, wherein each of the first to fourth metal material layers comprises at least one selected from the group consisting of Cr oxide, Ta oxide, and Cr—Ta oxide, and has a thickness of 0.5 nm to 2 nm.

13. A magnetic recording head comprising:
a main magnetic pole configured to apply a recording magnetic field to a magnetic recording medium;
an auxiliary magnetic pole configured to structure a magnetic circuit in conjunction with the main magnetic pole; and
a laminated oscillator between the main magnetic pole and auxiliary magnetic pole, the laminated oscillator configured to supply current from the main magnetic pole to the auxiliary magnetic pole,
wherein the laminated oscillator has a junction area perpendicular to a current-carrying direction, which is smaller than that of the main magnetic pole,
the laminated oscillator includes the following layers laminated from the main magnetic pole side in the following order; a second magnetic layer having a coercive force smaller than a magnetic field applied from the main magnetic pole and having a magnetic field generated by micro wave oscillation, a first magnetic layer formed of a metal different from that of the second magnetic layer and configured to inject spin transfer torque into the second magnetic layer, and a non-magnetic intermediate layer configured to cut a direct magnetic coupling between the first magnetic layer and the second magnetic layer, a cooling/heating material is interposed between the laminated oscillator and the main magnetic pole, and the cooling/heating material includes the following layers laminated from the laminated oscillator side in the following order;

a first metal material layer having the same junction area as that of the laminated oscillator, a first thermoelectric material layer having the same junction area as that of the laminated oscillator, a second thermoelectric material layer having the same junction area as that of the main magnetic pole, and a second metal material layer having the same junction area as that of the main magnetic pole.

14. The magnetic recording head of claim 13, wherein each of the first and second thermoelectric material layers comprises at least one selected from the group consisting of CuN, Pt, Ni, Co, and Ru.

15. The magnetic recording head of claim 13, wherein each of the first and second metal material layers comprises at least one selected from the group consisting of Cr, Fe, NiFeCr, and CoFeCr.

16. The magnetic recording head of claim 13, wherein each of the first and second metal material layer comprises at least one selected from the group consisting of Cr oxide, Ta oxide, and Cr—Ta oxide, and has a thickness of 0.5 nm to 2 nm.

17. A magnetic recording head comprising:
a main magnetic pole configured to apply a recording magnetic field to a magnetic recording medium;
an auxiliary magnetic pole configured to structure a magnetic circuit in conjunction with the main magnetic pole; and
a laminated oscillator between the main magnetic pole and auxiliary magnetic pole, the laminated oscillator configured to supply current from the main magnetic pole to the auxiliary magnetic pole,
wherein the laminated oscillator has a junction area perpendicular to a current-carrying direction, which is smaller than that of the main magnetic pole,
the laminated oscillator includes the following layers laminated from the main magnetic pole side in the following order; a second magnetic layer having a coercive force smaller than a magnetic field applied from the main magnetic pole and having a magnetic field generated by micro wave oscillation, a first magnetic layer formed of a metal different from that of the second magnetic layer and configured to inject spin transfer torque into the second magnetic layer, and a non-magnetic intermediate layer configured to cut a direct magnetic coupling between the first magnetic layer and the second magnetic layer, a cooling/heating material is interposed between the auxiliary magnetic pole and the laminated oscillator, and the cooling/heating material includes the following layers laminated from the auxiliary magnetic pole side in the following order;

a third thermoelectric material layer having the same junction area as that of the auxiliary magnetic pole, a third metal material layer having the same junction area as that of the auxiliary magnetic pole, a fourth metal material layer having the same junction area as that of the laminated oscillator, and a fourth thermoelectric material layer having the same junction area as that of the laminated oscillator.

18. The magnetic recording head of claim 17, wherein each of the third and fourth thermoelectric material layers comprises at least one selected from the group consisting of CuN, Pt, Ni, Co, and Ru.

19. The magnetic recording head of claim 17, wherein each of the third and fourth metal material layers comprises at least one selected from the group consisting of Cr, Fe, NiFeCr, and CoFeCr.

20. The magnetic recording head of claim 17, wherein each of the third and fourth metal material layers comprises at least one selected from the group consisting of Cr oxide, Ta oxide, and Cr—Ta oxide, and has a thickness of 0.5 nm to 2 nm.

21. A magnetic recording head comprising:
a main magnetic pole configured to apply a recording magnetic field to a magnetic recording medium;
an auxiliary magnetic pole configured to structure a magnetic circuit in conjunction with the main magnetic pole; and
a laminated oscillator between the main magnetic pole and auxiliary magnetic pole, the laminated oscillator configured to supply current from the main magnetic pole to the auxiliary magnetic pole,
wherein the laminated oscillator has a junction area perpendicular to a current-carrying direction, which is smaller than that of the main magnetic pole,
the laminated oscillator includes the following layers laminated from the main magnetic pole side in the following order; a second magnetic layer having a coercive force smaller than a magnetic field applied from the main magnetic pole and having a magnetic field generated by micro wave oscillation, a first magnetic layer formed of a metal different from that of the second magnetic layer and configured to inject spin transfer torque into the second magnetic layer, and a non-magnetic intermediate layer configured to cut a direct magnetic coupling between the first magnetic layer and the second magnetic layer,
a first cooling/heating material is interposed between the laminated oscillator and the main magnetic pole, and a second cooling/heating material is interposed between the auxiliary magnetic pole and the laminated oscillator,
the first cooling/heating material includes the following layers laminated from the laminated oscillator side in the following order;
a first metal material layer having the same junction area as that of the laminated oscillator,
a first thermoelectric material layer having the same junction area as that of the laminated oscillator,
a second thermoelectric material layer having the same junction area as that of the main magnetic pole, and
a second metal material layer having the same junction area as that of the main magnetic pole,
and the second cooling/heating material includes the following layers laminated from the auxiliary magnetic pole side in the following order;
a third thermoelectric material layer having the same junction area as that of the auxiliary magnetic pole,
a third metal material layer having the same junction area as that of the auxiliary magnetic pole,
a fourth metal material layer having the same junction area as that of the laminated oscillator, and
a fourth thermoelectric material layer having the same junction area as that of the laminated oscillator.

22. The magnetic recording head of claim 21, wherein each of the first to fourth thermoelectric material layers comprises at least one selected from the group consisting of CuN, Pt, Ni, Co, and Ru.

23. The magnetic recording head of claim 21, wherein each of the first to fourth metal material layers comprises at least one selected from the group consisting of Cr, Fe, NiFeCr, and CoFeCr.

24. The magnetic recording head of claim 21, wherein each of the first to fourth metal material layers comprises at least one selected from the group consisting of Cr oxide, Ta oxide, and Cr—Ta oxide, and has a thickness of 0.5 nm to 2 nm.

25. A magnetic recording/reproducing apparatus comprising a magnetic recording head,
the magnetic recording head comprising:
a main magnetic pole configured to apply a recording magnetic field to a magnetic recording medium;
an auxiliary magnetic pole configured to structure a magnetic circuit in conjunction with the main magnetic pole; and
a laminated oscillator between the main magnetic pole and auxiliary magnetic pole, the laminated oscillator configured to supply current from the main magnetic pole to the auxiliary magnetic pole,
wherein the laminated oscillator has a junction area perpendicular to a current-carrying direction, which is smaller than that of the main magnetic pole,
the laminated oscillator includes the following layers laminated from the main magnetic pole side in the following order; a second magnetic layer having a coercive force smaller than a magnetic field applied from the main magnetic pole and having a magnetic field generated by micro wave oscillation, a first magnetic layer formed of a metal different from that of the second magnetic layer and configured to inject spin transfer torque into the second magnetic layer, and a non-magnetic intermediate layer configured to cut a direct magnetic coupling between the first magnetic layer and the second magnetic layer,
a cooling/heating material is interposed between the laminated oscillator and the main magnetic pole, and
the cooling/heating material includes the following layers laminated from the laminated oscillator side in the following order;
a first thermoelectric material layer having the same junction area as that of the laminated oscillator,
a first metal material layer having the same junction area as that of the laminated oscillator,
a second metal material layer having the same junction area as that of the main magnetic pole, and
a second thermoelectric material layer having the same junction area as that of the main magnetic pole.

26. A magnetic recording/reproducing apparatus comprising a magnetic recording head,
the magnetic recording head comprising:
a main magnetic pole configured to apply a recording magnetic field to a magnetic recording medium;
an auxiliary magnetic pole configured to structure a magnetic circuit in conjunction with the main magnetic pole; and
a laminated oscillator between the main magnetic pole and auxiliary magnetic pole, the laminated oscillator configured to supply current from the main magnetic pole to the auxiliary magnetic pole,
wherein the laminated oscillator has a junction area perpendicular to a current-carrying direction, which is smaller than that of the main magnetic pole,
the laminated oscillator includes the following layers laminated from the main magnetic pole side in the following order; a second magnetic layer having a coercive force smaller than a magnetic field applied from the main magnetic pole and having a magnetic field generated by micro wave oscillation, a first magnetic layer formed of a metal different from that of the second magnetic layer and configured to inject spin transfer torque into the second magnetic layer, and a non-magnetic intermediate layer configured to cut a direct magnetic coupling between the first magnetic layer and the second magnetic layer, a cooling/heating material is interposed between the auxiliary magnetic pole and the laminated oscillator, and the cooling/heating material includes the following layers laminated from the auxiliary magnetic pole side in the following order;

a third metal material layer having the same junction area as that of the auxiliary magnetic pole, a third thermoelectric material layer having the same junction area as that of the auxiliary magnetic pole, a fourth thermoelectric material layer having the same junction area as that of the laminated oscillator, and a fourth metal material layer having the same junction area as that of the laminated oscillator.

27. A magnetic recording/reproducing apparatus comprising a magnetic recording head, the magnetic recording head comprising:

a main magnetic pole configured to apply a recording magnetic field to a magnetic recording medium;

an auxiliary magnetic pole configured to structure a magnetic circuit in conjunction with the main magnetic pole; and a laminated oscillator between the main magnetic pole and auxiliary magnetic pole, the laminated oscillator configured to supply current from the main magnetic pole to the auxiliary magnetic pole, wherein the laminated oscillator has a junction area perpendicular to a current-carrying direction, which is smaller than that of the main magnetic pole, the laminated oscillator includes the following layers laminated from the main magnetic pole side in the following order; a second magnetic layer having a coercive force smaller than a magnetic field applied from the main magnetic pole and having a magnetic field generated by micro wave oscillation, a first magnetic layer formed of a metal different from that of the second magnetic layer and configured to inject spin transfer torque into the second magnetic layer, and a non-magnetic intermediate layer configured to cut a direct magnetic coupling between the first magnetic layer and the second magnetic layer, a first cooling/heating material is interposed between the laminated oscillator and the main magnetic pole, and a second cooling/heating material is interposed between the auxiliary magnetic pole and the laminated oscillator, the first cooling/heating material includes the following layers laminated from the laminated oscillator side in the following order;

a first thermoelectric material layer having the same junction area as that of the laminated oscillator, a first metal material layer having the same junction area as that of the laminated oscillator, a second metal material layer having the same junction area as that of the main magnetic pole, and a second thermoelectric material layer having the same junction area as that of the main magnetic pole, and the second cooling/heating material includes the following layers laminated from the auxiliary magnetic pole side in the following order;

a third metal material layer having the same junction area as that of the auxiliary magnetic pole, a third thermoelectric material layer having the same junction area as that of the auxiliary magnetic pole, a fourth thermoelectric material layer having the same junction area as that of the laminated oscillator, and a fourth metal material layer having the same junction area as that of the laminated oscillator.

28. A magnetic recording/reproducing apparatus comprising a magnetic recording head, the magnetic recording head comprising:

a main magnetic pole configured to apply a recording magnetic field to a magnetic recording medium;

an auxiliary magnetic pole configured to structure a magnetic circuit in conjunction with the main magnetic pole; and a laminated oscillator between the main magnetic pole and auxiliary magnetic pole, the laminated oscillator configured to supply current from the main magnetic pole to the auxiliary magnetic pole, wherein the laminated oscillator has a junction area perpendicular to a current-carrying direction, which is smaller than that of the main magnetic pole, the laminated oscillator includes the following layers laminated from the main magnetic pole side in the following order; a second magnetic layer having a coercive force smaller than a magnetic field applied from the main magnetic pole and having a magnetic field generated by micro wave oscillation, a first magnetic layer formed of a metal different from that of the second magnetic layer and configured to inject spin transfer torque into the second magnetic layer, and a non-magnetic intermediate layer configured to cut a direct magnetic coupling between the first magnetic layer and the second magnetic layer, a cooling/heating material is interposed between the laminated oscillator and the main magnetic pole, and the cooling/heating material includes the following layers laminated from the laminated oscillator side in the following order;

a first metal material layer having the same junction area as that of the laminated oscillator, a first thermoelectric material layer having the same junction area as that of the laminated oscillator, a second thermoelectric material layer having the same junction area as that of the main magnetic pole, and a second metal material layer having the same junction area as that of the main magnetic pole.

29. A magnetic recording/reproducing apparatus comprising a magnetic recording head, the magnetic recording head comprising:

a main magnetic pole configured to apply a recording magnetic field to a magnetic recording medium;

an auxiliary magnetic pole configured to structure a magnetic circuit in conjunction with the main magnetic pole; and a laminated oscillator between the main magnetic pole and auxiliary magnetic pole, the laminated oscillator configured to supply current from the main magnetic pole to the auxiliary magnetic pole, wherein the laminated oscillator has a junction area perpendicular to a current-carrying direction, which is smaller than that of the main magnetic pole, the laminated oscillator includes the following layers laminated from the main magnetic pole side in the following order; a second magnetic layer having a coercive force smaller than a magnetic field applied from the main magnetic pole and having a magnetic field generated by micro wave oscillation, a first magnetic layer formed of a metal different from that of the second magnetic layer and configured to inject spin transfer torque into the second magnetic layer, and a non-magnetic intermediate layer configured to cut a direct magnetic coupling between the first magnetic layer and the second magnetic layer, a cooling/heating material is interposed between the auxiliary magnetic pole and the laminated oscillator, and the cooling/heating material includes the following layers laminated from the auxiliary magnetic pole side in the following order;

a third thermoelectric material layer having the same junction area as that of the auxiliary magnetic pole, a third metal material layer having the same junction area as that of the auxiliary magnetic pole, a fourth metal material layer having the same junction area as that of the laminated oscillator, and a fourth thermoelectric material layer having the same junction area as that of the laminated oscillator.

30. A magnetic recording/reproducing apparatus comprising a magnetic recording head, the magnetic recording head comprising:

a main magnetic pole configured to apply a recording magnetic field to a magnetic recording medium;

an auxiliary magnetic pole configured to structure a magnetic circuit in conjunction with the main magnetic pole; and a laminated oscillator between the main magnetic pole and auxiliary magnetic pole, the laminated oscillator configured to supply current from the main magnetic pole to the auxiliary magnetic pole, wherein the laminated oscillator has a junction area perpendicular to a current-carrying direction, which is smaller than that of the main magnetic pole, the laminated oscillator includes the following layers laminated from the main magnetic pole side in the following order; a second magnetic layer having a coercive force smaller than a magnetic field applied from the main magnetic pole and having a magnetic field generated by micro wave oscillation, a first magnetic layer formed of a metal different from that of the second magnetic layer and configured to inject spin transfer torque into the second magnetic layer, and a non-magnetic intermediate layer configured to cut a direct magnetic coupling between the first magnetic layer and the second magnetic layer, a first cooling/heating material is interposed between the laminated oscillator and the main magnetic pole, and a second cooling/heating material is interposed between the auxiliary magnetic pole and the laminated oscillator, the first cooling/heating material includes the following layers laminated from the laminated oscillator side in the following order;

a first metal material layer having the same junction area as that of the laminated oscillator, a first thermoelectric material layer having the same junction area as that of the laminated oscillator, a second thermoelectric material layer having the same junction area as that of the main magnetic pole, and a second metal material layer having the same junction area as that of the main magnetic pole, and the second cooling/heating material includes the following layers laminated from the auxiliary magnetic pole side in the following order;

a third thermoelectric material layer having the same junction area as that of the auxiliary magnetic pole, a third metal material layer having the same junction area as that of the auxiliary magnetic pole, a fourth metal material layer having the same junction area as that of the laminated oscillator, and a fourth thermoelectric material layer having the same junction area as that of the laminated oscillator.

* * * * *